J. MICCO & V. GUIDO.
RAIL JOINT.
APPLICATION FILED NOV. 12, 1912.
1,074,447.
Patented Sept. 30, 1913.
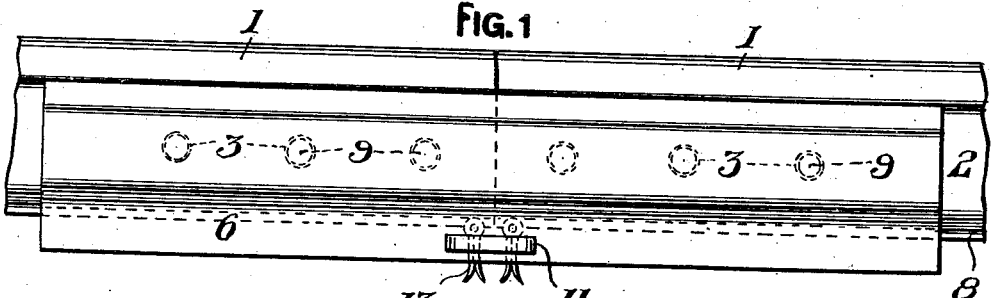
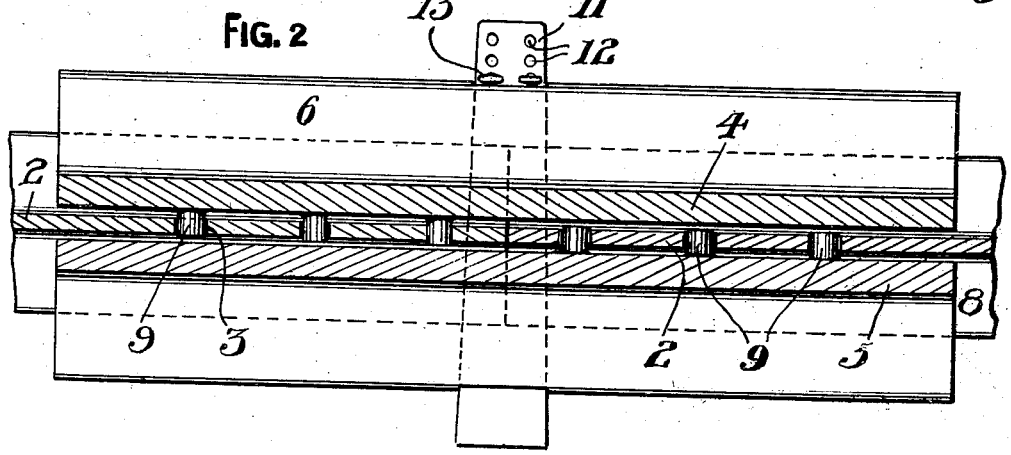
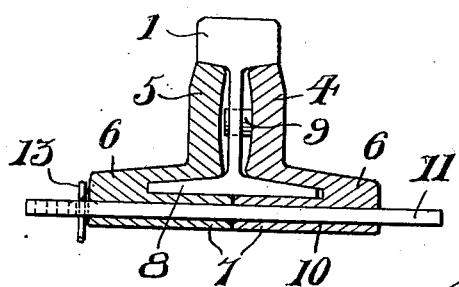
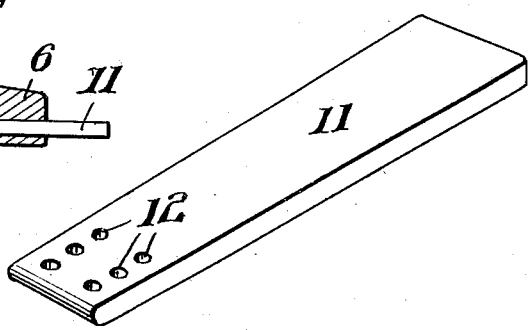
WITNESSES
INVENTORS
John Micco
Kito Guido
ATTORNEYS

UNITED STATES PATENT OFFICE.

JOHN MICCO AND VITO GUIDO, OF NEW CASTLE, PENNSYLVANIA.

RAIL-JOINT.

1,074,447. Specification of Letters Patent. Patented Sept. 30, 1913.

Application filed November 12, 1912. Serial No. 731,019.

*To all whom it may concern:*

Be it known that we, JOHN MICCO, citizen of the United States of America, and VITO GUIDO, subject of the King of Italy, residing at New Castle, in the county of Lawrence and State of Pennsylvania, have invented certain new and useful Improvements in Rail-Joints, of which the following is a specification, reference being had therein to the accompanying drawing.

This invention relates to rail joints, and the objects of our invention are to provide positive and reliable means, as hereinafter set forth, for connecting the abutting or confronting ends of rails whereby the same cannot become laterally or vertically displaced, and to provide a fastener that obviates the necessity of using bolts and nuts as a fastening means for splice bars.

Other objects of our invention are to provide a rail fastener embodying splice bars that are connected together in a manner to prevent longitudinal displacement of rails and at the same time affording a smooth tread for rolling stock and to provide a rail joint consisting of comparatively few parts, inexpensive to manufacture, durable, easy to assemble, and highly efficient for the purposes for which it is intended.

With the above and other objects in view the invention resides in the novel construction, combination and arrangements of parts to be hereinafter specifically described and then claimed.

Reference will now be had to the drawing, wherein:—

Figure 1 is a side elevation of a rail joint in accordance with our invention, Fig. 2 is a horizontal sectional view of the same, Fig. 3 is a cross sectional view of the rail joint, Fig. 4 is a perspective view of a key or wedge adapted to form part of the rail joint.

Further describing the invention in detail with reference to the drawing wherein like numerals denote corresponding parts throughout:—1 denotes rails having the webs 2 thereof provided with openings 3, such as accommodate the bolts ordinarily used in connection with splice bars for connecting the confronting or abutting ends of rails.

4 and 5 denote splice bars having the lateral flanges 6 thereof provided with inwardly projecting tie plates 7 that extend under the base flanges 8 of said rails. The splice bars 4 and 5 have the inner sides thereof provided with pins 9 that extend into the openings 3 of the rails to prevent longitudinal displacement thereof.

The tie plates 7 of the splice bars 4 and 5, intermediate the ends thereof, are provided with transversely alining openings 10 and these openings accommodate a tapering key or wedge 11 that is driven into said openings. The small end of the key or wedge has a plurality of openings 12 to receive cotter pins 13 or other locking means for retaining the key or wedge in the openings 10, whereby the tie plates of the splice bars will be locked together, against lateral displacement, thereby firmly holding the rails in juxtaposition.

The outer edges of the splice bars 4 and 5 can be notched to receive spikes or other fastening means employed for retaining the rail joint upon ties, sleepers or suitable supports.

When rails that have been used in connection with ordinary splice bars, bolts and nuts are encountered, each rail having the web thereof provided with a plurality of openings, the inner side of the splice bar 4 can be provided with a plurality of pins 9, whereby the pins will extend into the openings of said rails and hold said rails against longitudinal displacement.

One embodiment of our invention has been illustrated and we reserve the right to make such changes as fall within the scope of the appended claim.

What we claim is:—

In a rail joint, the combination with a pair of opposing rails having the web thereof provided with openings, of splice bars engaging the sides of said rails and provided with flanges engaging the bases of the rails, pins carried by said splice bars and extending into said openings to prevent longitudinal displacement of said rails relative to the splice bars, angle-shaped tie plates of greater thickness than the flanges of said splice bars, the vertical portions of said tie plates integral with said flanges and opposing the longitudinal edges of the bases of the rails, the horizontal portions of said tie plates supporting the bases of the rails, and each of the same thickness throughout, said horizontal portions abutting and provided intermediate their upper and lower faces with transversely extending alining openings, each of said openings of a length equal to the width of that horizontal portion in which the opening is formed, said alining openings tapering from end to end, a tapering key fitted in said openings for connecting said tie plates together and out of engagement with the base flanges of the rails, and means extending through the smaller end of said key for maintaining it in said openings.

In testimony whereof we affix our signatures in the presence of two witnesses.

JOHN MICCO.

VITO $\overset{\text{his}}{\times}$ GUIDO.
mark

Witnesses:
ARCANGELO CANNAVICCI,
JOHN B. MATURO.

Copies of this patent may be obtained for five cents each, by addressing the "Commissioner of Patents, Washington, D. C."